Dec. 12, 1961  K. I. HARNER  3,012,401
POSITIVE FEEDBACK ABATEMENT MEANS
Filed Dec. 31, 1958  2 Sheets-Sheet 1
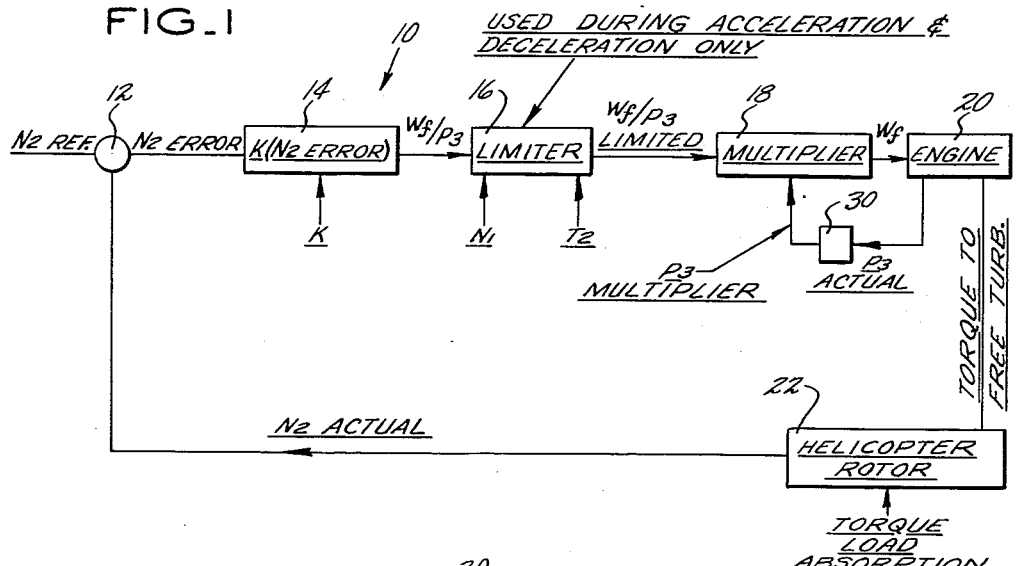
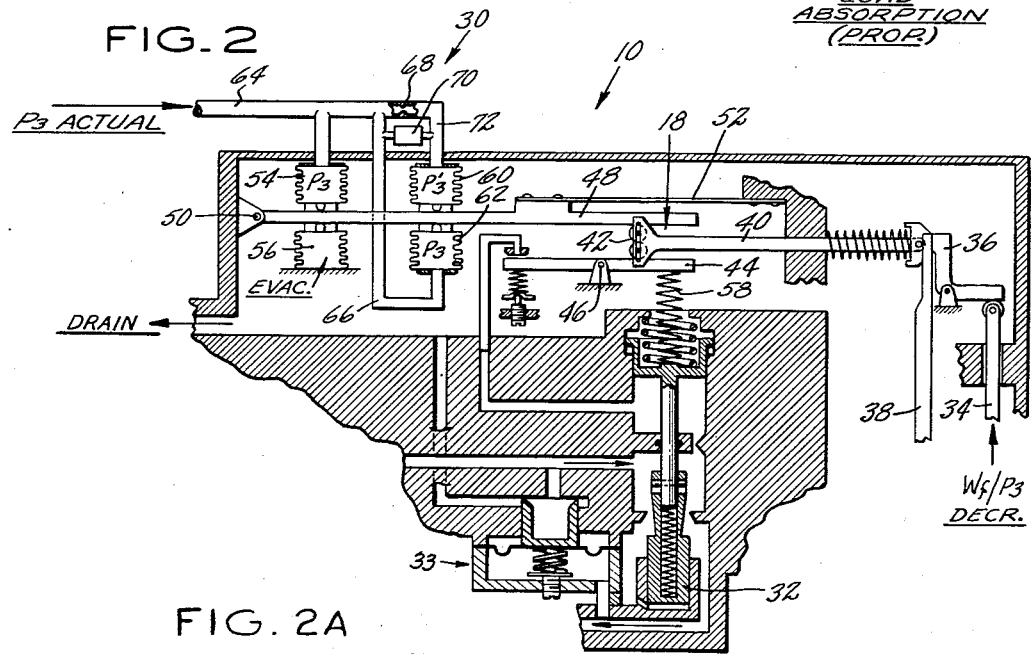
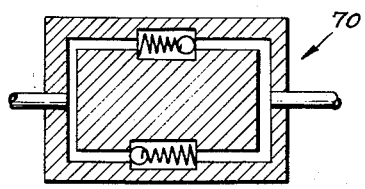
INVENTOR
KERMIT I. HARNER
BY Vernon F. Hauschild
ATTORNEY

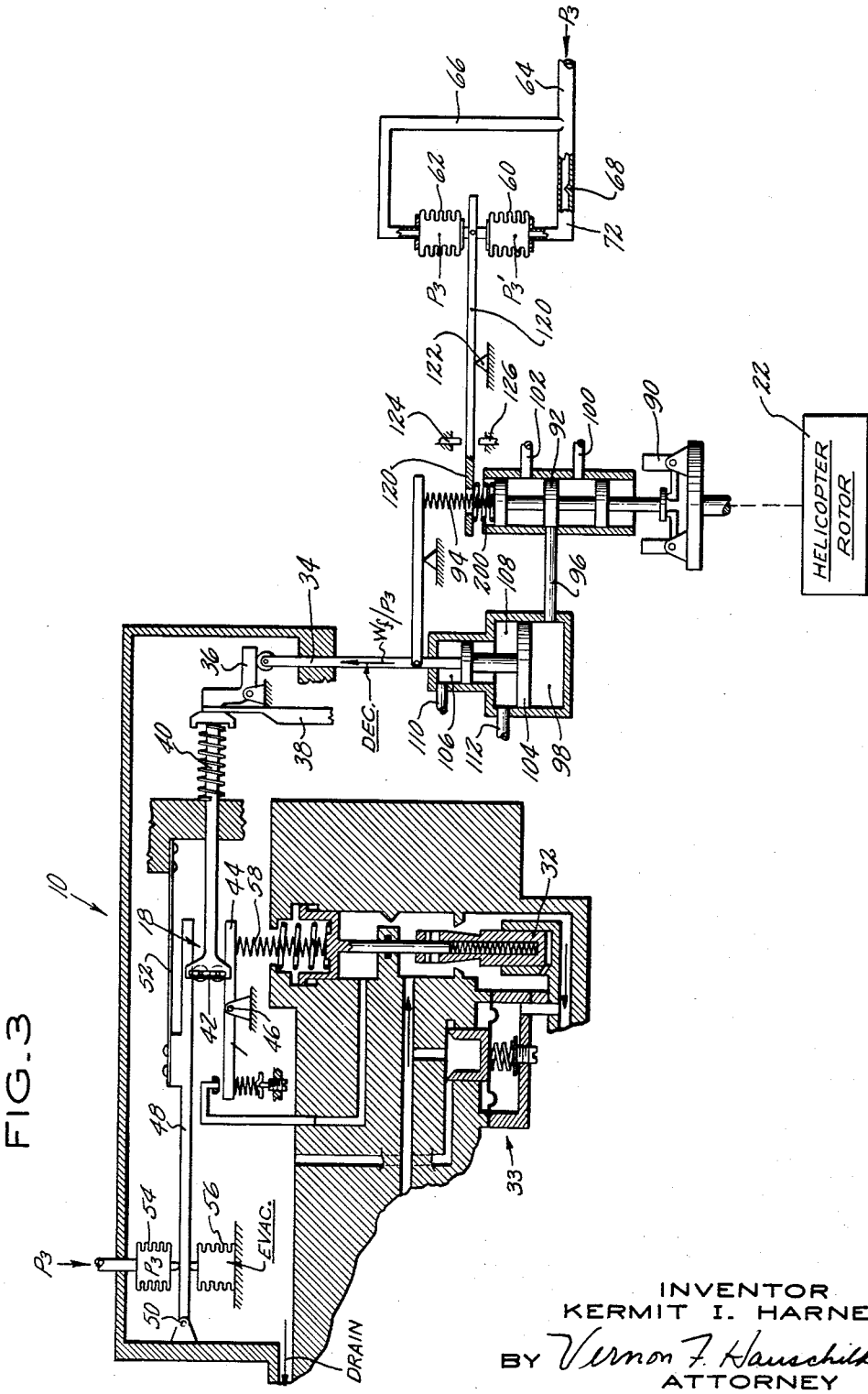

United States Patent Office 3,012,401
Patented Dec. 12, 1961

3,012,401
POSITIVE FEEDBACK ABATEMENT MEANS
Kermit I. Harner, Windsor, Conn., assignor to United Aircraft Corporation, East Hartford, Conn., a corporation of Delaware
Filed Dec. 31, 1958, Ser. No. 784,370
16 Claims. (Cl. 60—39.28)

This invention relates to fluid control systems and more particularly to means for abating the effects of positive feedback therein.

It is an object of this invention to teach positive feedback abatement means comprising apparatus opposing the transmission of signal changes, such as a parameter change, in a positive feedback system as a function of the time rate-of-change of the signal change without affecting steady state operation.

It is a further object of this invention to teach constant speed powerplant fuel control means for engines having high frequency oscillation or order of instability in engine load comprising a force balance multiplier which is actuated by the signal from two variables, one of which is powerplant output or speed, including a powerplant output or speed feedback from the powerplant to the fuel control means in positive feedback relationship, with provisions for opposing transmitting the signals responsive to powerplant output or speed changes to the multiplier as a function of the derivative or time rate-of-change of the powerplant output or speed signal.

Other objects and advantages will be apparent from the specification and claims, and from the accompanying drawings which illustrate an embodiment of the invention.

FIG. 1 is a diagrammatic representation of a fluid control means, preferably a fuel control, utilizing my invention.

FIG. 2 is a fragmentary showing of a fluid control means, preferably a fuel control, illustrating a preferred embodiment of my invention.

FIG. 2A is an enlarged, cross-section view of the override device shown in FIG. 2.

FIG. 3 is a fragmentary showing of a fluid control means, illustrating an alternate embodiment of my invention.

My invention is intended for use primarily in a fuel control system for a free turbine engine, which free turbine is driven by the exhaust gases from a gas generator such as the turbojet or main engine turbine and which in turn may drive a helicopter rotor, a turboprop engine propeller, or the like. It is the main function of the fuel control to control the free turbine and hence, for example, the helicopter rotor, at a constant speed designated as $N_2$. My fuel control regulates the rate of fuel flow, $W_f$, to the engine thereby controlling the engine output so as to maintain speed $N_2$ constant. If free turbine speed $N_2$ falls below the selected or reference speed $N_2$, my fuel control increases the rate of fuel $W_f$ to the engine to increase free turbine speed $N_2$, and vice versa.

A brief description of the fuel control embodying my invention will be given herein and greater particulars with respect thereto may be found in U.S. Patent Nos. 2,854,818 and 2,857,741 and U.S. application Serial Nos. 528,878 and 528,879, and the environment will be shown generally in U.S. Patent No. 2,811,324, to which reference may be had.

A definite relationship exists between free turbine speed $N_2$ or the error therein and the jet engine parameter $W_f/P_3$, where $W_f$ represents fuel flow to the jet engine, which is preferably of the axially aligned compressor, burner and turbine type described in U.S. Patent Nos. 2,711,631 and 2,747,367, and $P_3$ represents compressor discharge pressure of the jet engine compressor and, further, $P_3$ is indicative of jet engine power output or speed. Utilizing these facts, my fuel control performs its $N_2$ control function by utilizing engine parameters to perform the calculation $(W_f/P_3 \text{ reference}) \times (P_3 \text{ actual}) = (W_f \text{ actual})$ Referring to FIG. 1 we see a diagrammatic representation of the fuel flow control 10 utilizing my invention. The desired free turbine speed $N_2$ reference is compared to $N_2$ actual at station 12, $N_2$ actual being transmitted thereto from the helicopter rotor, to determine $N_2$ error. $N_2$ error is transmitted to station 14 where it is multiplied by a constant K to calculate the parameter $(W_f/P_3 \text{ reference})$ which bears a direct relationship to $N_2$ error and is chosen in preference to $W_f$, since it has a more limited range. Due to considerations such as engine surge, engine turbine over-temperature, and combustion chamber flame blowout, it is necessary to establish maximum and minimum $W_f/P_3$ limits and such is accomplished by passing parameter $(W_f/P_3 \text{ reference})$ through station 16 where it is acted upon by jet engine parameter $T_2$ (compressor inlet temperature) and $N_1$ (jet engine turbine speed) to establish these maximum and minimum $W_f/P_3$ limits so that the parameter $(W_f/P_3 \text{ limited})$ is transmitted from station 16 to multiplier station 18. At station 18, the parameter $(W_f/P_3 \text{ limited})$ is pultiplied by $(P_3 \text{ actual})$ which is transmitted to station 18 by engine 20, to produce the product $(W_f \text{ actual})$, which product is used to regulate fuel flow to engine 20 to drive the free turbine of engine 20 at speen $N_2$. The free turbine of engine 20 is connected directly to helicopter rotor 22 to drive helicopter rotor 22 at speed $N_2$ so that helicopter rotor 22 absorbs the torque of the free turbine of jet engine 20. The speed of the free turbine of engine 20 and hence the speed of helicopter rotor 22 ($N_2$ actual), is transmitted from helicopter rotor 22 to station 12.

It will be noted that station 16, which sends a first signal to multiplier 18 and engine 20 which sends a second signal to multiplier 18 will so connect to multiplier 18 that a change in first signal $(W_f/P_3 \text{ limited})$ sent to multiplier 18 by station 16 will increase the product $(W_f \text{ actual})$ in the same direction as the first signal change. The change in the product $(W_f \text{ actual})$ will cause a change in the fuel being provided to engine 20 in this same algebraic direction and hence a change in this same algebraic direction in the power output of engine 20 so that the $(P_3 \text{ actual})$ signal sent from engine 20 to multiplier 18 will be changed in this same algebraic direction and will cause a second change in the product of multiplier 18 in this same algebraic direction. This continued buildup of changes in the same algebraic direction, whether increasing or decreasing, is known as a positive feedback and is a destabilizing influence in the system and, further, if the magnitude of this positive feedback is sufficient, it will continue ad infinitum unless abated in some fashion. As used herein, changes in an algebraic direction are either increasing or decreasing changes and changes in the same algebraic direction are all increasing or all decreasing.

It is the purpose of my invention to abate this positive feedback system and such will be accomplished by incorporating mechanism at point 30 in the line transmitting the ($P_3$ actual) signal from engine 20 to multiplier 18 which will oppose the transmission of changes in ($P_3$ actual) signal from engine 20 to multiplier 18 as a function of the derivative or time rate-of-change of ($P_3$ actual) signal by means which will not affect steady state operation. In this fashion, the deleterious effect of positive feedback on fuel control unit 10 will be abated.

Apparatus for accomplishing my positive feedback abatement function through derivative opposition is shown in FIG. 2. Fuel control 10 comprises throttle valve 32 which is positioned by force motion multiplier 18 as a function of the product ($W_t/P_3$ limited) transmitted thereto by movable rod 34 which actuates bell crank 36 as a function of ($W_t/P_3$ reference) as limited by shaft 38 to the parameter ($W_t/P_3$ limited). This last-recited parameter positions bar 40 which carries rolling fulcrum 42 thereon. Rolling fulcrum 42 contacts beam 44 which is pivotable about point 46 and further contacts beam 48 which is pivotable about point 50 and which is held in contact with rolling pivot point 42 by stationary spring 52. The translatory motion imparted to bar 40 as a function of ($W_t/P_3$ limited) in the fashion just described establishes a pressure point on beam 44 at a precise distance from fulcrum point 46. Force is applied at this established pressure point 42 on beam 44 by the action of opposed bellows 54 and 56, which are subjected to ($P_3$ multiplier) pressure and a vacuum respectively, so that a force proportional to the product or moment established by the force of the opposed bellows 54 and 56 through beam 48 against beam 44 and the distance between points 42 and 46 on beam 44 is transmitted by multiplier 18 to displace lever 44 thereby metering fluid into servo chamber 220 and moving the throttle valve until the force exerted through spring 58 returns bar 44 to its normal position. The objective is to create a torque balance on beam 44. By bypass means 33, the pressure drop across throttle valve 32 is maintained constant so that the rate of fuel flow therethrough ($W_f$ actual) is a direct function of the position of or area of throttle valve 32, which position or area is determined by the product ($W_t/P_3$ limited) × ($P_3$ multiplier).

The derivative opposition positive feedback abatement apparatus is incorporated into control 10 in FIG. 2 by incorporating opposed bellows 60 and 62 on opposite sides of beam 48 and at a distance from pivot point 50 different from opposed bellows 54 and 56, which distance is preferably larger as shown in FIG. 2. Accordingly, we now have two opposed bellows systems imparting forces to beam 48, in the form of moments about pivot point 50, which moments will be combined algebraically to be imparted as a moment of given force at point 42 about pivot point 50, which moment imparts a force on beam 44 a preselected distance from pivot point 46 as determined by the $W_t/P_3$ signal transmitted to multiplier 18 by lever 34 as limited by lever 38. The ($P_3$ actual) pressure signal which enters bellows 54 through line 64 also passes to bellows 62, which is on the opposite side of beam 48 from bellows 54, through line 66. The ($P_3$ actual) pressure signal also enters bellows 60, which is positioned to oppose bellows 62, after passing through restriction 68, which is preferably fixed, so that it prevents an instantaneous change in pressure ($P'_3$ actual) on bellows 60. Accordingly, bellows 60 is a rate bellows. The pressure in bellows 60 ($P'_3$ actual) will become equal to pressure ($P_3$ actual), in a time interval governed by the size of orifice 68 and the volume of bellows 60, so that bellows 60 and 62 will then have cancelling effects upon beam 48.

It will therefore be seen that except during periods of changes in pressure ($P_3$ actual) entering line 64, opposed bellows 60 and 62 will both be subjected to pressure ($P_3$ actual) and therefore will exert cancelling forces on beam 48 so as to have no effect during steady state operation.

For purposes of illustration, assume that the engine governed by control 10 is in steady state operation so that ($P_3$ actual) remains constant, under these conditions beam 48 will be acted upon solely by the pressure difference which will exist between bellows 54, which is subjected to ($P_3$ actual) pressure and 56, which is evacuated, since cancelling forces are exerted upon beam 48 by bellows 60 and 62. If signal ($P_3$ actual) should now increase suddenly in line 64, the force exerted on beam 48 by bellows 54 will increase and will attempt to move beam 48 but will be opposed by a greater force being exerted in the opposite direction on beam 48 by bellows 62, which is also subjected to pressure ($P_3$ actual) but which is a greater distance from fulcrum point 50 than is bellows 54. The cancelling or signal preventing force exerted upon beam 48 by bellows 62 will be opposed by the pressure ($P'_3$ actual) in bellows 60 but since this pressure does not change instantly, the combined action of bellows 60 and 62 is to oppose the instantaneous transmission of the ($P_3$ actual) signal to multiplier 18 of control 10 through bellows 54.

It will be obvious to those skilled in the art by the proper selection of bellows sizes and distances from fulcrum point 50, the positive feedback abatement apparatus described herein may be caused, during periods of ($P_3$ actual) signal changes, to diminish positive feedback, cancel out positive feedback, or overcome positive feedback and impart negative feedback to control 10. The three last-enumerated results will be accomplished by causing the moment imparted to beam 48 by opposed bellows 60 and 62 to be less than, equal to or greater than the moment imparted to beam 48 by opposed bellows 54 and 56.

Since during periods of acceleration, the ($P_3$ multiplier) signal sent from station 30 to multiplier 18 cannot be permitted to reduce too drastically, as a safety measure, a derivative overruling mechanism 70 connects line 66 with line 72, thereby bypassing restriction 68 and permitting ($P_3$ actual) from line 64 to pass into bellows 60 therethrough. It is suggested that opposed or oppositely directed check valves in parallel of the type shown in FIG. 2A be utilized to accomplish this overruling function in mechanism 70.

An alternate $P_3$ derivative scheme is shown in FIG. 3, and it differs from the embodiment illustrated and described in connection with FIG. 2. The FIG. 2 configuration served to abate the deleterious effects of positive feedback by regulating the ($P_3$ actual) signal sent from engine 10 to multiplier 18, there to be multiplied by the parameter ($W_t/P_3$ limited) while in the FIG. 3 embodiment the ($P_3$ actual) signal sent from engine 10 to multiplier 18 is sent accurately while variations in ($P_3$ actual) are used to abate positive feedback by modifying the ($W_t/P_3$ limited) signal which is to be multiplied by the ($P_3$ actual) signal in multiplier 18.

As fully explained and illustrated in the aforementioned U.S. Patent Nos. 2,854,818 and 2,857,741, a portion of fuel flow control 10 comprises helicopter rotor 22 driven flyball unit 90, which, in response to helicopter rotor speed $N_2$, positions distributor valve 92 in opposition to the force of speeder spring 94. The position of distributor valve 92 determines the servo pressure which will pass through line 96 and into servo chamber 98 from high pressure line 100 and/or drain line 102, to act against servo piston 104, in opposition to the drain pressure in chamber 106 and the high pressure in chamber 108 derived from lines 110 and 112, respectively, to actuate bar 34, crank 36 and beam 40 so as to vary the position of fulcrum point 42 on torque balanced beam 44, thereby altering the amount of fuel flow to engine 20 and hence varying the speed of helicopter rotor 22. A reverse or negative ($W_f/P_3$ limited) signal is provided to multiplier 18 in response to the rate of change in parameter ($P_3$ actual) to abate the positive feedback by placing opposed bellows 60 and 62 on opposite sides of beam 120, which beam pivots about point 122 and acts against spring 200 to exert a bias force on distributor valve 92. Positive stops 124 and 126 are placed on opposite sides of beam 120 to limit the authority of the said bias force to small amplitudes, thereby averting problems during acceleration. To accomplish this negative ($W_f/P_3$ limited) signal in response to rate of ($P_3$ actual) changes, ($P_3$ actual) is caused to pass through line 64 and thence to bellows 62 and 60 through lines 66 and 72, respectively, the latter of which has fixed restriction 68 therein to cause a delayed signal ($P'_3$ actual) to bellows 60, thereby making bellows 60 a rate bellows, so that a reverse or negative signal with respect to the ($P_3$ actual) signal change is provided to multiplier 18 in the form of ($W_f/P_3$ limited) signal due to the net resulting force of bellows 60 and 62 acting upon distributor valve 92, throughbeam 120 and spring 200. This effect will cause fuel flow to be reduced by an increasing compressor discharge pressure ($P_3$) because of the biasing effect on the $W_f/P_3$ signal.

It is to be understood that the invention is not limited to the specific embodiment herein illustrated and described but may be used in other ways without departure from its spirit as defined by the following claims.

I claim:

1. In a fluid control system, a fluid flow metering valve, a double variable torque type multiplier connected to position said valve, means transmitting a variable positioning signal to said multiplier, means transmitting a variable force signal to said multiplier and cooperating with first means so that said multiplier produces a valve positioning force which is the product of said variable positioning signal and said variable force signal, and means responsive to time rate-of-change of said variable force signal preventing the transmission of changes in said variable force signal to said multiplier for a selected time.

2. In a fluid control system, a fluid flow metering valve, a double variable torque type multiplier connected to position said valve, means transmitting a variable positioning signal to said multiplier, means transmitting a variable force signal to said multiplier and cooperating with first means so that said multiplier produces a valve positioning force which is the product of said variable positioning signal and said variable force signal, means responsive to time rate-of-change of said variable force signal opposing the transmission of said variable force signal to said multiplier, and means operable in response to said second signal when said second signal exceeds a selected value to override the opposition of said last-mentioned means.

3. In a fluid control system, a fluid flow metering valve, a double variable torque type multiplier connected to position said valve, first means transmitting a variable positioning signal to said multiplier, second means controlled as a function of said valve position and transmitting a variable force signal to said multiplier, and means responsive to time rate-of-change of said variable force signal preventing the transmission of changes in said variable force signal to said multiplier for a selected time.

4. In a fluid control system including a multiplier, first means transmitting a first signal to said multiplier, second means transmitting a second signal to said multiplier to be multiplied thereby by said first signal to produce the product thereof, said second means actuated by said product to produce said second signal, said first and second means being so connected that an increase in said first signal increases said product and an increase in said product increases said second signal to again increase said product thereby establishing a positive feedback, and means responsive to time rate-of-change of said second signal opposing the transmission of said second signal to said multiplier thereby abating the effect of said positive feedback.

5. In a fluid control system including a multiplier comprising a beam pivotable about a fulcrum, first means transmitting a first signal to said multiplier, second means transmitting a pressure signal to said multiplier in the form of a force imparted to said beam by a first bellows subjected to said pressure signal and opposed by an evacuated bellows to be multiplied thereby by said first signal to produce the product thereof, said second means actuated by said product to produce said pressure signal, said first and second means being so connected that an increase in said first signal increases said product and an increase in said product increases said pressure signal to again increase said product thereby establishing a positive feedback, and third means responsive to time rate-of-change of said pressure signal comprising a second bellows on the opposite side of said beam from said first bellows and subjected to said pressure signal and opposed by a rate bellows which is also subjected to said second signal such that said third means imparts a force to said beam in opposition to the force imparted to said beam by said second means thereby abating the effect of said positive feedback.

6. An engine, a control system providing fuel to said engine including a fuel flow metering valve, a multiplier producing the product of two signals and positioning said valve as a function of said product thereby regulating the flow of fuel to said engine and hence the power output of said engine as a function of said product and means transmitting a first of said two signals to said multiplier, means transmitting a second of said two signals in the form of an engine power output signal to said multiplier, said engine, said control system and said second signal means connected to establish a positive feedback so that a change in said first signal changes said product in the same algebraic direction, which changes said second signal in the same algebraic direction, which changes said algebraic product again in the said direction, and means responsive to time rate-of-change of said second signal opposing the transmission of said second signal to said multiplier.

7. An engine in combination with a constant speed control system comprising means to meter fuel to said engine as a function of the product of two variables one of which is indicative of engine speed error, first means to transmit a first signal proportional to engine speed error to said fuel metering means, second means to transmit a second signal to said fuel metering means to be multiplied thereby by said first signal to produce the product of said two variables and meter fuel to said engine as a function of said product, said first and second means connected to said fuel metering means and said fuel metering means connected to said engine so that a change in said first signal causes a change in said product in the same algebraic direction, which product change causes a change in said second signal in the same algebraic direction, which second signal change causes a second increase in said product in the same algebraic direction thereby establishing a positive feedback system, and means responsive to time rate-of-change of said second signal opposing the transmission of said second signal to said fuel metering means.

8. An engine comprising a compressor, burner and turbine in axial alignment in combination with a constant speed control system comprising means to meter fuel to said engine including a valve and means to maintain the pressure drop thereacross constant and a multiplier to control the area thereof as a function of the product of two variables indicative of engine speed error one of which variables is engine compressor discharge pressure, first means to transmit a first signal proportional to one of said two variables to said multiplier, second means to transmit a second signal proportional to engine compressor discharge pressure to said multiplier to be multiplied thereby by said first signal to produce the product of said two variables and position said valve to meter fuel to said engine as a function of said product, said first and second means connected to said fuel metering means and said fuel metering means connected to said engine so that a change in said first signal causes a change in said product in the same algebraic direction, which product change causes a change in said engine compressor discharge pressure signal in the same algebraic direction, which engine compressor discharge pressure signal change causes a second increase in said product in the same algebraic direction thereby establishing a positive feedback system, and means responsive to time rate-of-change of said second signal opposing the transmission of said engine compressor discharge pressure signal to said multiplier.

9. An engine comprising a compressor, burner and turbine in axial alignment in combination with a constant speed control system comprising means to meter fuel to said engine including a valve and means to maintain the pressure drop thereacross constant and a force balance multiplier to control the area thereof as a function of the product of two variables indicative of engine speed error one of which variables is engine compressor discharge pressure, first means to transmit a first signal proportional to one of said two variables to said multiplier, second means including opposed bellows acting upon a beam pivotable about a fulcrum to transmit a second signal proportional to engine compressor discharge pressure to said multiplier to be multiplied thereby by said first signal to produce the product of said two variables and position said valve to meter fuel to said engine as a function of said product, said first and second means connected to said fuel metering means and said fuel metering means connected to said engine so that a change in said first signal causes a change in said product in the same algebraic direction, which product change causes a change in said engine compressor discharge pressure signal in the same algebraic direction, which engine compressor discharge pressure signal change causes a second change in said product in the same algebraic direction thereby establishing a positive feedback system, and third means responsive to time rate-of-change of said second signal comprising a second bellows on the opposite side of said beam from and on the same side of said fulcrum as said first bellows and subjected to said second signal and opposed by a rate bellows which is also subjected to said second signal such that said third means imparts a force to said beam in opposition to the force imparted to said beam by said second means thereby abating the effect of said positive feedback.

10. In a fluid control system, a fluid flow metering valve, a double variable torque type multiplier connected to position said valve, first means transmitting a variable force signal to said multiplier, second means transmitting a variable positioning signal to said multiplier, and means responsive to time rate-of-change of said variable force signal connected to said second means to modify the transmission of said variable positioning signal to said multiplier.

11. In a fluid control system, a fluid flow metering valve, a double variable torque type multiplier producing a product of said two variables and connected to position said valve, first means transmitting a variable force signal to said multiplier, second means transmitting a variable positioning signal to said multiplier, means responsive to time rate-of-change of said variable force signal and connected to said second means to overpower the transmission of said variable positioning signal to said multiplier so that said product varies inversely of said variable positioning signal.

12. In a fluid control system, a fluid flow metering valve, a double variable torque type multiplier connected to position said valve, first means transmitting a variable force signal to said multiplier, second means controlled as a function of said valve position and transmitting a variable positioning signal to said multiplier, and third means responsive to time rate-of-change of said variable force signal and connected to said second means to overpower the transmission of said variable positioning signal to said multiplier so that said valve is moved in a direction opposite to the direction which would otherwise be caused by a change in said variable positioning signal.

13. In a fluid control system including a double variable torque type multiplier, first means transmitting a variable force signal to said multiplier, second means transmitting a variable positioning signal to said multiplier to be multiplied thereby by said variable force signal to produce the product thereof, said second means actuated by said product to produce said second signal, said first and second means being so connected that an increase in said first signal increases said product and an increase in said product increases said second signal to again increase said product thereby establishing a positive feedback, and means responsive to time rate-of-change of said variable force signal and connected to said second means to overpower the transmission of said variable positioning signal to said multiplier thereby causing said valve to move in a direction opposite to the direction which would otherwise be caused by a change in said variable positioning second signal to abate the effect of said positive feedback.

14. An engine in combination with an engine constant speed control having a fuel valve which regulates fuel flow to said engine and including a pivotal beam multiplier positioning said valve, engine speed sensing means transmitting a force signal in the form of fluid pressure to said multiplier beam, first means transmitting an engine speed related parameter signal in the form of a variable position location of said force signal to said multiplier beam to be multiplied by said force signal so that the product thereof positions said valve, and so that a change in said force creating signal causes a similar change in said position creating signal and thereby further changing said force creating signal to establish a positive feedback, positive feedback abatement means including opposed bellows imparting a force to said multiplier beam, a conduit leading to each of said bellows, a restriction in one said conduit, means to pass said force signal fluid pressure through said conduits to said bellows so that said bellows impart cancelling forces to said multiplier beam when said force signal is in steady state condition and so that said bellows impart unequal forces to said multiplier beam when said force signal varies in an algebraic direction to alter the transmission of said second signal to said multiplier in an algebraic direction opposite to the change in said force signal.

15. In a fluid control system, a fluid flow metering valve, a double variable torque type multiplier connected to position said valve, means transmitting a variable positioning signal to said multiplier, means transmitting a variable force signal to said multiplier and cooperating with first means so that said multiplier produces a valve positioning force which is the product of said variable positioning signal and said variable force signal, and means responsive to instantaneous changes in one of said signals opposing the transmission of one of said signals to said multiplier.

16. An engine comprising a compressor, burner and turbine in axial alignment in combination with a constant speed control system comprising means to meter fuel to said engine including a valve and means to maintain the pressure drop thereacross constant and a multiplier to control the area thereof as a function of the product of two variables indicative of engine speed error one of which variables is engine compressor discharge pressure, first means to transmit a first signal proportional to one of said two variables to said multiplier, second means to transmit a second signal proportional to engine compressor discharge pressure to said multiplier to be multiplied thereby by said first signal to produce the product of said two variables and position said valve to meter fuel to said engine as a function of said product, said first and second means connected to said fuel metering means and said fuel metering means connected to said engine so that a change in said first signal causes a change in said product in the same algebraic direction, which product change causes a change in said engine compressor discharge pressure signal in the same algebraic direction, which engine compressor discharge pressure signal change causes a second increase in said product in the same algebraic direction thereby establishing a positive feedback system, and means responsive to time rate-of-change of one of said signals opposing the transmission of the other of said signals to said multiplier.

References Cited in the file of this patent

UNITED STATES PATENTS

| | | |
|---|---|---|
| 2,285,540 | Stein et al. | June 9, 1942 |
| 2,409,871 | Krogh | Oct. 22, 1946 |
| 2,675,818 | Gallo et al. | Apr. 20, 1954 |
| 2,762,385 | Smerke | Sept. 11, 1956 |